United States Patent [19]

Baggett et al.

[11] 4,156,769

[45] May 29, 1979

[54] PROCESS FOR MAKING POLYCARBONATES USING 1,1-DIMETHYL UREA COMPOUNDS AS THE CATALYSTS

[75] Inventors: Joseph M. Baggett, Freeport; George E. Ham, Lake Jackson, both of Tex.

[73] Assignee: The Dow Chemical Company, Midland, Mich.

[21] Appl. No.: 874,582

[22] Filed: Feb. 2, 1978

[51] Int. Cl.² .............................................. C08G 63/62
[52] U.S. Cl. ...................................... 528/199; 528/171
[58] Field of Search ............ 260/47 XA, 77.5 D, 463, 260/49

[56] References Cited

U.S. PATENT DOCUMENTS

| | | | |
|---|---|---|---|
| 3,261,810 | 7/1966 | Chiba ...................................... 260/47 |
| 3,275,601 | 8/1966 | Schnell et al. ................... 260/47 XA |
| 3,334,128 | 8/1967 | Brown ................................... 260/463 |
| 3,763,099 | 10/1973 | Jaquiss et al. ................... 260/47 XA |

*Primary Examiner*—Theodore E. Pertilla
*Attorney, Agent, or Firm*—B. G. Colley

[57] ABSTRACT

Thermoplastic polycarbonates are prepared by interfacial polymerization wherein carbonyl halides, dihydric phenols and a catalytic amount of a 1,1-dimethyl urea compound is reacted.

The polycarbonates thus prepared are useful as moldable resins in a manner well known in the art.

4 Claims, No Drawings

PROCESS FOR MAKING POLYCARBONATES USING 1,1-DIMETHYL UREA COMPOUNDS AS THE CATALYSTS

BACKGROUND OF THE INVENTION

This invention relates to a method of making polycarbonates prepared by the interfacial technique by using 1,1-dimethyl urea compounds as the catalysts.

It is known in the patent literature that in the interfacial polymerization process to make aromatic polycarbonates from dihydric phenols and phosgene the use of small amounts of tertiary amines, quaternary ammonium compounds, phosphorium, arsonium, sulfonium, guanidine, and diamido compounds can be used to catalyze the reaction. Patents which show the foregoing are U.S. Pat. Nos. 3,275,601; 3,185,664; 3,261,810; and 3,763,099.

SUMMARY OF THE INVENTION

It now has been discovered that thermoplastic aromatic polycarbonates can be made under interfacial polycarbonate forming conditions wherein the following are reacted:
1. a carbonyl halide,
2. a dihydric phenol or mixtures of dihydric phenols, and
3. a catalytic amount of a compound which has the following formula: $CH_3-N(CH_3) - C(O) - N(R)R_1$ where R and $R_1$ are independently hydrogen and an alkyl group containing 1-5 carbon atoms.

More specifically the process of this invention comprises reacting under interfacial polycarbonate-forming conditions
1. a carbonyl halide,
2. a dihydric phenol or mixtures of dihydric phenols, and
3. a catalytic amount of tetramethyl urea.

The process is thus useful to make thermoplastic polycarbonates without the need for the known catalysts. The polycarbonates prepared have a weight average molecular weight range from about 20,000 to about 60,000 as measured by gel permeation chromatography.

While the trialkyl amine catalysts of the prior art are known to be very active catalysts in this reaction, it has been found that the 1,1-dimethyl urea catalysts of this invention are almost as active and thus could be used as substitute catalysts if it is so desired. This is surprising in that diamido compounds are known to be poor catalysts and a closely related compound, 1,1,3,3, diethyl urea, is not active as is shown by control 1 hereinafter.

DETAILED DESCRIPTION

The process of this invention is carried out by first reacting and stirring a dihydric phenol compound or a mixture of dihydric phenols such as bisphenol A with an aqueous caustic solution made from sodium or potassium hydroxide having a pH greater than 9 and preferably in the pH range from 10-12 wherein the aqueous solution contains a catalytic amount of a 1,1-dimethyl urea compound.

For the purpose of this invention, a catalytic quantity is defined as being about 0.05 to about 5.0 weight percent based on the dihydric phenol of a 1,1-dimethyl urea compound. This catalytic quantity is added to the reactants together with 5-10 moles of a halogenated solvent such as methylene chloride.

The catalyzed reactants are stirred and allowed to react for about 0.25 to about 3 hours at a temperature of about 0° to about 100° C. and preferably 10°-45° C.

Suitable catalytic compounds within the scope of this invention are exemplified by 1,1,3,3-tetramethyl urea, 1,1,1,3-trimethyl urea, 1,1-dimethyl urea, 1,1-dimethyl 3,3-diethyl urea, 1,1-dimethyl 3,3-dipentyl urea, 1,1-dimethyl 3-ethyl urea, 1,1-dimethyl 3-butyl urea, 1,1-dimethyl 3,3-dipropyl urea, 1,1 dimethyl 3-propyl urea, and the like.

The dihydric phenols employed in the practice of this invention are known dihydric phenols in which the sole reactive groups are the two phenolic hydroxyl groups. Some of these are represented by the general formula

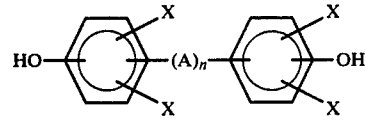

where A is a divalent hydrocarbon radical containing 1-15 carbon atoms,

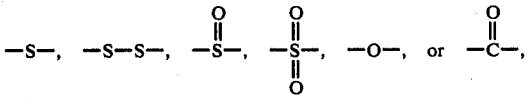

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

One group of suitable dihydric phenols are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydrophenyl)nonane
2,2-bis(3,-ethyl-4-hydroxyphenyl)octane
4,4-bis(4-hydroxyphenyl)heptane
3,3-bis(3-methyl-4-hydroxyphenyl)hexane
3,3-bis(3,5-difluoro-4-hydroxyphenyl)butane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:
bis(3,5-diisopropyl-4-hydroxyphenyl)sulfone
bis(3-methyl-5-ethyl-4-hydroxyphenyl)sulfone bis(3-chloro-4-hydroxyphenyl)sulfone
bis(3,5-dibromo-4-hydroxypgenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

A further group of dihydric phenols outside the scope of the above generic formula which may be used in the practice of the invention includes the dihydroxy benzenes, and the halo- and alkylsubstituted dihydroxy benzenes, such as, for example, resorcinol, hydroquinone, 1,4-dihydroxy-2-chlorobenzene, 1,4-dihydroxy-2-bromobenzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The recovery of the polycarbonate is accomplished by decanting the aqueous layer, treating the remaining halogenated solvent with a strong aqueous acid solution (pH 1-3) such as hydrochloric or sulfuric acid solution, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

EXAMPLE

Into a one liter flask equipped with stirrer, dip tube, thermometer and reflux condenser were charged 75 g. of Para-Bisphenol A and 1.55 g. of t-butylphenol. The flask was purged with nitrogen for five minutes then 275 ml. of water was added and the mixture was stirred while purging with nitrogen for another five minutes. After this time, 32 ml. of 35 weight percent sodium hydroxide was added, the mixture stirred while purging with nitrogen, then 215 ml. of methylene chloride was added, followed by 0.5 ml. (0.5 g.) of 1,1,3,3-tetramethyl urea. Phosgene gas was then bubbled into the mixture, with stirring, until 40 g. of phosgene had been added. During this phosgenation, an additional 50 ml. of 35 weight percent sodium hydroxide solution was added. The phosgenation required 28 minutes and the mixture was stirred for an additional 30 minutes. The temperature of the reaction mixture was maintained at 25°-27° C.

After the reaction the mixture separated into two liquid layers and 150 ml. of the aqueous layer was removed from the reaction flask. The mixture was then made acid with hydrochloric acid and stirred for five minutes. After stirring, the mixture separated into two liquid layers and the organic layer was removed. The methylene chloride solution of polymer was then added to a large volume of n-hexane to precipitate the polymer. The solid polymer was then chopped to a desirable particle size in a blender containing water and dried under vacuum at 120° C.

The polymer was then molded into a tough, flexible film and had a weight average molecular weight of 25,566 as determined by gel permeation chromatography techniques (GPC).

Control 1

Substantially the same procedure as shown in Example 1 was repeated with the exception that 1,1,3,3-tetraethyl urea was added to the reaction mixture instead of 1,1,3,3-tetramethyl urea. The polymer which was obtained could not be molded into a tough, flexible film and had a weight average molecular weight of about 6-10,000.

Control 2

Substantially the same procedure as shown in Example I may be repeated with the exception that no catalyst is added to the reaction mixture. The polymer which is obtained cannot be molded into a tough, flexible film and has a weight average molecular weight of about 10,000 as determined by GPC.

We claim:
1. A process for making thermoplastic aromatic polycarbonates which comprises reacting under interfacial polycarbonate-forming conditions
   1. a carbonyl halide,
   2. a dihydric phenol or mixtures of dihydric phenols, and
   3. a catalytic amount of a compound which has the following formula:
      $$CH_3 - N(CH_3) - C(O) - N(R)R_1$$
   where R and $R_1$ are independently hydrogen and an alkyl group containing 1-5 carbon atoms.
2. The process as set forth in claim 1 wherein the catalytic amount used is from about 0.05 to about 5.0 weight percent based on the dihydric phenol.
3. A process for making thermoplastic polycarbonates which comprises reacting under interfacial polycarbonate-forming conditions
   1. a carbonyl halide,
   2. a dihydric phenol or mixtures of dihydric phenols, and
   3. a catalytic amount of tetramethyl urea.
4. The process as set forth in claim 3 wherein the catalytic amount used in from about 0.05 to about 5.0 weight percent based on the dihydric phenol.